Patented July 29, 1952

2,605,238

UNITED STATES PATENT OFFICE 2,605,238

MOLYBDENA-AMORPHOUS TITANIA CATALYSTS

Karl W. Krantz, Niskayuna, N. Y., assignor to E. I. du Pont de Nemours and Company, Wilmington, Del., a corporation of Delaware No Drawing. Application November 18, 1950, Serial No. 196,515

6 Claims. (Cl. 252—469)

This invention relates to catalyst compositions. More specifically, it relates to catalyst compositions containing a mixture of molybdenum trioxide and substantially amorphous titanium dioxide, and to such catalyst compositions modified by containing minor amounts of tungsten trioxide.

This application is a continuation-in-part of my abandoned copending application Serial No. 66,839, filed December 22, 1948.

It is an object of this invention to provide catalyst compositions for use in vapor-phase processes for the partial oxidation of organic compounds. Another object is to provide catalyst compositions which are particularly adapted for use in adiabatic vapor-phase processes for the manufacture of maleic anhydride by the partial oxidation of organic compounds. A still further object is to provide catalysts which are especially suitable in adiabatic vapor-phase processes for the oxidation of a butylene to maleic anhydride. Still other objects will become apparent hereinafter.

The foregoing and other objects of the invention are attained by means of catalyst compositions comprising an active mixture consisting essentially of molybdenum trioxide, substantially amorphous titanium dioxide, and optionally, tho preferably, tungsten trioxide, said oxides being present in the proportions of 1 to 8 mols of the titanium dioxide and 0 to 1 mol of tungsten trioxide for each 3 mols of molybdenum trioxide. In other words, the active catalytic mixture consists essentially of 1 to 8 mols of substantially amorphous titanium dioxide and preferably up to and including as much as 1 mol of tungsten trioxide for each 3 mols of molybdenum trioxide.

Preferably the amorphous titanium dioxide employed in the compositions of the invention has a surface area of at least 150 sq. meters per gram, and more preferably 150 to 250 sq. meters per gram, and the several oxides are present in the proportions of 2 to 6 mols of the titanium dioxide and 0.016 to 0.8 mol of tungsten trioxide for each 3 mols of molybdenum trioxide. Still more preferably, the catalyst compositions contain a mixture of the oxides as described above distributed on granular alpha-alumina.

All numerical references to surface area herein and in the appended claims are in terms of sq. meters per gram and relate to surface areas as determined with nitrogen by the Brunauer-Emmett-Teller method of surface area measurement. That method is fully described by P. H. Emmett in "Symposium on New Methods for Particle Size Determination in the Subsieve Range," American Society for Testing Materials, Washington, March 4, 1941, pages 95–105.

The molybdenum and tungsten oxides for use in the compositions of the invention may be prepared by any of the methods well-known in the art for the preparation of such oxides for catalytic use. For example, the ammonium or alkali metal salts of these compounds may be acidified to precipitate the respective hydrated oxides; these oxides may then be calcined up to a temperature as high as 600° C. thereby yielding the oxides. Alternatively, salts of the compounds such as ammonium molybdate and ammonium tungstate may be used directly in the preparation of the catalyst composition without further processing. These salts will then be converted to the oxides by heating them, or "firing" them as it is called, in situ in the catalyst chamber. Ordinarily the surface area of the molybdenum and tungsten oxides will be of the order of 2 to 10 sq. meters per gram.

The form of the titanium dioxide used in the compositions of the invention is critical. It is the presence of amorphous titanium dioxide, and preferably amorphous titanium dioxide having a surface area of at least 150 sq. meters per gram, in the compositions which makes them useful in vapor-phase adiabatic processes and particularly useful in such processes where a butylene is oxidized to maleic anhydride.

Amorphous titanium dioxide is suitably obtained by neutralizing a tetravalent titanium salt such as titanium tetrachloride in an aqueous solution. Following such procedure, a gel is obtained which can be dried and ground. Before drying, it is preferable, however, to wash the gel several times to free it of chloride ions. In drying the gel, the temperature should be kept relatively low, say not above about 150° C., in order to avoid changing the form of the product.

An amorphous titanium dioxide may also be obtained by boiling an aqueous solution of titanium tetrachloride. Boiling effects decomposition of the product and precipitation of a titanium oxide compound in the form of fine sand-like granules. The precipitate is easily recovered by filtration or centrifugation.

The catalytic oxides, titanium dioxide, molybdenum trioxide, and tungsten trioxide, are preferably supported on a granular inert carrier such as kieselguhr, silica, pumice, asbestos, alumina, Alundum, ceramic clay, firebrick, glass, silicon carbide and similar materials which are well known in the art as catalyst supports.

According to a preferred embodiment, the carrier or catalyst support is an alumina of the type known as tabular alumina or tabular corundum. This material is practically pure corundum or alpha alumina and is further characterized by having a low porosity, its surface area being below 1 sq. meter per gram and ordinarily in the order of 0.2 sq. meter per gram. This alpha alumina is made by firing aluminum hydroxide at elevated temperatures, say in the range of 800° C. to 1800° C. so that some sintering of the product occurs, but not substantial melting.

The adhesion of the catalytic oxides to the carrier or support is improved by the use of a binding agent. Oxalic acid is especially suitable for this purpose. Oxalic acid seems to form a complex with the oxides of molybdenum and tungsten in the preparation of catalyst compositions, according to the methods which will be more fully illustrated in the examples to follow, so that in the step of drying the catalyst composition a syrupy liquid is formed which coats the carrier or support and on further drying leaves an adherent coating of the oxides on the support. Other compounds which serve the same function are hydroxy acids such as tartaric and malic acids. These latter compounds are somewhat less desirable because they form some coke deposits upon ignition of the catalyst; such deposits tend to interfere with the performance and mechanical strength of the catalyst.

The particle size of the catalyst composition may vary considerably. Generally the average particle size of the catalyst composition for use in a fixed bed is from 2 thru 14 mesh and still more preferably 4 thru 8 mesh.

Thru the use of the aforementioned catalyst compositions, I have discovered that practical commercial vapor-phase processes for the preparation of maleic anhydride by the partial oxidation of suitable compounds can be operated adiabatically. According to these processes, the oxidizable compound is admixed in low concentration with a free oxygen-containing gas in excess of that necessary for complete combustion of the compound. The mixture is then passed over the catalyst at high-space velocity and the effluent gases from the catalyst are passed into heat exchange with the gas mixture to be fed over the catalyst so that the feed mixture is preheated and the effluent gas is cooled, the concentration of the oxidizable compound in the feed mixture and the space velocity being adjusted so that the heat requirements of the process are satisfied without otherwise supplying or abstracting any substantial quantity of heat.

A number of compounds are known to be suitable for use in catalytic oxidation vapor-phase processes for the production of maleic anhydride. Foremost among these compounds are the normal butylenes, butene-1 and butene-2. Other suitable substances are benzene, butane, butadiene, butyl alcohols, butyl aldehydes, unsaturated hydrocarbons containing 4 thru 8 carbon atoms such as cyclohexene and other substances from which butylene is readily generated. Any of these substances which are known to be oxidizable to maleic anhydride or combinations of such substances may be partially oxidized by passage over the catalysts of this invention. Preferably, however, the oxidizable compound is a four-carbon hydrocarbon selected from the group consisting of butane, butylene, and butadiene and still more preferably the compound is a normal butylene.

It will be appreciated by those skilled in the art that, in the vapor-phase adiabatic processes employing the catalysts of this invention as in other vapor-phase catalytic processes, it is not possible to state the operating limitations precisely in numbers since they are interdependent and also depend upon the activity of the catalyst used. Generally, however, and particularly if a butylene is used as the oxidizable compound, the feed gases in the process comprise a mixture containing from about 0.25 thru 0.75 mol per cent of the oxidizable compound and the space velocity is from 10,000 to 28,000 volumes of gas at standard conditions per hour per volume of catalyst.

The diluent for the oxidizable compound in the gaseous feed mixture is preferably air. The composition of the air may, of course, be modified by the addition or removal of inert constituents, or some other free oxygen-containing gas may be used instead of air provided, however, that there is in the gaseous feed mixture a free oxygen-containing gas in excess of that necessary for complete combustion of the oxidizable compound.

In employing the catalyst compositions of the invention in adiabatic vapor-phase processes for the preparation of maleic anhydride, the catalyst temperature is preferably maintained in the range of 450° thru 600° C. This is done by controlling the temperature of the gaseous feed to the catalyst at about 350° thru 450° C. while keeping the concentration of the oxidizable compound in the gas mixture and the space velocity within the limits set out above. The effluent gases from the catalyst having attained a temperature substantially the same as that of the catalyst, namely 450° thru 600° C., are passed into heat exchange with the feed gases thereby effecting the required preheating of the feed gases to a temperature of 350° thru 450° C.

The catalysts of the invention may be used in a vapor-phase adiabatic process in which the feed gases are brought into contact with the catalyst only once and there is but a single heat exchange between feed gases and effluent gases from the catalyst. Preferably, however, the gases pass thru a series of catalysis steps in each of which the temperatures are maintained in the ranges set out above. In such a multistage process, it has been found advantageous to refortify the gases leaving one converter before passing them into the next converter and this may be done by adding a suitable oxidizable compound such as butylene to the cooled effluent gases from a catalysis step in amount sufficient to bring the butylene content of the gases to 0.25 thru 0.75 mol per cent. Thus there may be one, two, three, or even more catalysis steps, the practical limit being reached when the free oxygen in the gas passing through the system is no longer sufficiently in excess of the amount required for complete combustion of the oxidizable compound to justify the installation of additional catalysis units.

The use of the catalyst compositions of the invention is not limited to any particular type of catalysis apparatus. The gas-catalyst contact may be attained in any of the conventional ways. For example, the catalyst may be placed in tubes, upon shelves or trays, or a fluid flow-type system may be used.

Catalyst compositions of the invention, methods for preparing them and methods for using them are illustrated in the following examples.

Example I 100 grams of titanium tetrachloride is dissolved in water. The resulting acidic solution is neutralized with ammonium hydroxide to about pH 7 to precipitate a titania gel. The gel is removed by filtration and is washed by reslurrying in 1500 cc. of water. The wash water is then separated from the gel and the washing operation is repeated four times in order to remove chloride ions from the gel.

The washed, filtered titania gel is then dried by heating, first at a low temperature until much of the water has been removed and then gradually increasing the temperature to a maximum of about 150° C. There is obtained a granular product which is ground to pass 200 mesh. The surface area of this product is 230-240 sq. meters per gram.

240 grams of ammonium molybdate and 80.5 grams of ammonium tungstate are mixed in 1200 cc. of water. A part of the tungstate remains suspended but the rest of the solids dissolve. Nitric acid is added to this solution until the pH is about 3.5 to precipitate oxides of molybdenum and tungsten in hydrated form.

The hydrates are filtered and calcined by heating gradually up to about 400° C. to drive off water and ammonium nitrate. There is thus obtained a friable, porous, solid cake which is passed thru a 200 mesh sieve to obtain a powdered material.

10.0 grams of the sieved molybdenum oxide-tungsten oxide mixture, 5.0 grams of the powdered titanium dioxide, and 102 grams of 8–14 mesh tabular alumina having a surface area of about 0.2 sq. meter per gram are slurried in 45 cc. of water containing in solution 5 grams of oxalic acid. The water is then evaporated to give the catalyst composition ready for charging to the converter.

In the composition of this example, the oxides are present in the proportions of about 3.7 mols of titanium dioxide and 0.66 mol of tungsten trioxide for each 3 mols of molybdenum trioxide.

The catalyst composition of Example I is effectively employed in an adiabatic vapor-phase process for the production of maleic anhydride from butene-2 as follows:

Butene-2 is mixed with air to give a gaseous mixture containing 0.40 mol per cent of butene. This gaseous mixture is passed at the rate of 825,000 cc. (standard conditions) per hour thru a tube containing 55 cc. (packed volume) of the catalyst composition of Example I.

The maximum catalyst temperature is maintained at about 530° C. and the hot effluent gases from the catalyst are passed into heat exchange with the feed gases to the catalyst to preheat the feed gases to 370° C.

The hot effluent gases from the first catalyst mass are cooled to about 370° C. in the heat exchange step. Butene is added to these cooled gases at the rate of 3300 cc. per hour to give a gaseous mixture containing 0.4 to 0.5 mol. per cent butene and this mixture is then passed over a second catalyst mass having the same volume and the same maximum temperature as the first catalyst mass.

The hot effluent gases from the second catalyst mass are cooled to about 370° C. and the cooled gas is again refortified with butene to give a mixture containing about 0.4 to 0.5 mol per cent butene and this refortified gaseous mixture is passed over a third catalyst mass having a volume equal to the first two catalyst masses and at a temperature of about 530° C.

The effluent gases from the third catalyst mass are then passed into a system for the recovery of the maleic anhydride. There is recovered 0.49 gram of maleic anhydride for each gram of butene consumed.

Example II 5.0 grams of titanium dioxide prepared according to the method given in Example I is added to an aqueous solution containing 12.3 grams of ammonium molybdate and 4.1 grams of ammonium tungstate. The resulting slurry is mixed with 102 grams of granular alpha alumina (4 thru 8 mesh). The mixture is heated to drive off water leaving a granular solid catalyst composition in satisfactory form for charging to a catalytic converter unit.

Example III

A solution of 15.7 grams of titanium tetrachloride in 157 cc. of water is boiled until precipitation of the titanium as the hydrated dioxide is substantially complete. A sandy precipitate is obtained. The precipitate is centrifuged and without washing is mixed with a slurry consisting of 10 grams of molybdenum trioxide-tungsten trioxide mixture prepared as in Example I, 5 grams of oxalic acid dihydrate and 45 cc. of water. The entire slurry is admixed with 102 grams of tabular alumina as in Example I and the water is evaporated to give the catalyst composition ready for charging to a catalytic converter. The titanium dioxide in this catalyst composition is in substantially amorphous form and has a surface area of 194 sq. meters per gram.

Example IV 240 grams of ammonium molybdate in 1200 cc. of aqueous solution are mixed with 85.5 grams of ammonium tungstate. The mixture is acidified with 144 grams of 70% nitric acid, dried at 115° C. and baked for 4 hours at 400° C.

Titanium dioxide is prepared by adding ammonium hydroxide to aqueous titanium tetrachloride, washing the resulting gel to remove chloride ion and drying at a low temperature. This titania has a surface area of 188 sq. meters per gram.

5 grams of the titania are mixed with 10 grams of the molybdenum oxide-tungsten oxide, prepared as above, in 50 cc. of a 10% oxalic acid solution. The mixture is slurried with a 60 cc. volume of 4-8 mesh tabular alumina and the liquid is evaporated leaving the oxide mixture distributed on the tabular alumina.

The utility of the catalyst composition of Example IV is demonstrated by an experiment in which butene-2 is mixed with air to give a gaseous mixture containing 0.70 mol per cent of butene and this gaseous mixture is passed over the catalyst at a space velocity of 825,000 cc. (standard conditions) per hour per 55 cc. of catalyst at a temperature of 523° C. There is recovered 0.48 grams of maleic anhydride for each gram of butene consumed.

A catalyst prepared in the same manner as that of Example IV but using crystalline titanium dioxide (anatase) having a surface area of 9.1 sq. meters per gram, instead of amorphous high surface area titania, was found to give zero yield of maleic anhydride and zero conversion in a process in which a butene-2-air mixture containing 0.70% of the butene was passed over the catalyst at a space velocity of 825,000 cc. per hour per 55 cc. of catalyst at a temperature of 414° C. Similar negative results were obtained employing a catalyst in which the titanium dioxide was in the crystalline form (rutile) having a surface area less than 150 sq. meters per gram.

*Example V*

12.3 grams of ammonium heptamolybdate tetrahydrate, and 4.02 grams of ammonium p-tungstate hexahydrate are stirred into a mixture of 100 ml. of water and 11 ml. of 15 N ammonium hydroxide. Only a minor amount of the ammonium tungstate dissolves and 3.90 grams are removed by filtration. To the filtrate 100 mls. of a titanium nitrate solution containing an equivalent to 5.0 grams of titanium dioxide is added dropwise with stirring. A smooth creamy precipitate is formed. The pH of the mixture is adjusted to 4 to 5 by addition of dilute ammonium hydroxide and the precipitate is then filtered with suction and dried at 110 to 115° C.

The dry cake is ground to pass a 100-mesh sieve and is mixed with 20 ml. of a 10% tartaric acid solution and 2 ml. of 15 N ammonium hydroxide. This mixture is then mixed with 60 ml. of 4 to 8 mesh tabular alumina (Alcoa T-61) and the resulting mix is heated to evaporate the liquid thus leaving a dry catalyst composition.

Using the catalyst composition of this example, a 25.6% conversion of butene to maleic anhydride is obtained employing a feed of 0.75% butene in air at 20,000 hr.$^{-1}$ space velocity at a peak temperature of 539° C.

*Example VI*

15 grams of molybdenum trioxide and 5 grams of amorphous titania are pasted on 102 grams of 4 to 8 mesh tabular alumina using oxalic acid as a binder. The molybdenum trioxide used is a high quality material meeting the A. C. S. standard and containing 99.8% $MoO_3$. The titania has a surface area in excess of 150 sq. meters per gram. A pasting step is carried out by slurrying the several solids in a dilute aqueous solution of the oxalic acid and then evaporating off the water.

The catalyst composition of this example gives a 25.8% conversion of butene to maleic anhydride operating with a gas feed of 0.7% butene in air at a space velocity of 15,000 hr.$^{-1}$ and a peak temperature of 500° C.

I claim:

1. A catalyst composition comprising an active mixture consisting essentially of molybdenum trioxide and substantially amorphous titanium dioxide having a surface area of at least 150 sq. meters per gram, said oxides being present in the proportions of 1 to 8 mols of the titanium dioxide for each 3 mols of molybdenum trioxide.

2. A catalyst composition comprising an active mixture consisting essentially of molybdenum trioxide, tungsten trioxide and substantially amorphous titanium dioxide, said oxides being present in the proportions of 1 to 8 mols of the titanium dioxide and up to 1 mol of tungsten trioxide for each 3 mols of molybdenum trioxide.

3. A catalyst composition comprising an active mixture consisting essentially of molybdenum trioxide, tungsten trioxide and substantially amorphous titanium dioxide having a surface area of at least 150 sq. meters per gram, said oxides being present in the proportions of 1 to 8 mols of the titanium dioxide and up to 1 mol of tungsten trioxide for each 3 mols of molybdenum trioxide.

4. A catalyst composition comprising an active mixture consisting essentially of molybdenum trioxide, tungsten trioxide and substantially amorphous titanium dioxide having a surface area of 150–250 sq. meters per gram, said oxides being present in the proportion of 2 to 6 mols of the titanium dioxide and 0.016 to 0.8 mol of tungsten trioxide for each 3 mols of molybdenum trioxide.

5. A catalyst composition comprising an active mixture consisting essentially of molybdenum trioxide, tungsten trioxide and substantially amorphous titanium dioxide having a surface area of 150–250 sq. meters per gram, said mixture being distributed on granular alpha alumina, said oxides being present in the proportion of 2 to 6 mols of the titanium dioxide and 0.016 to 0.8 mol of tungsten trioxide for each 3 mols of molybdenum trioxide.

6. A process for the preparation of a catalyst composition which comprises admixing an amorphous titanium dioxide having a surface area of at least 150 sq. meters per gram with a compound of a class consisting of molybdenum trioxide and molybdenum-containing salts decomposable to molybdenum trioxide on heating and with a compound of a class consisting of tungsten trioxide and tungsten-containing salts decomposable to tungsten trioxide on heating, said materials being admixed in the proportions of 1 to 8 mols of the titanium dioxide and up to 1 mol of tungsten trioxide for each 3 mols of molybdenum trioxide.

KARL W. KRANTZ.

REFERENCES CITED

The following references are of record in the file of this patent:

UNITED STATES PATENTS

| Number | Name | Date |
|---|---|---|
| 2,365,895 | Mavity | Dec. 26, 1944 |